United States Patent Office 3,157,233
Patented Nov. 17, 1964

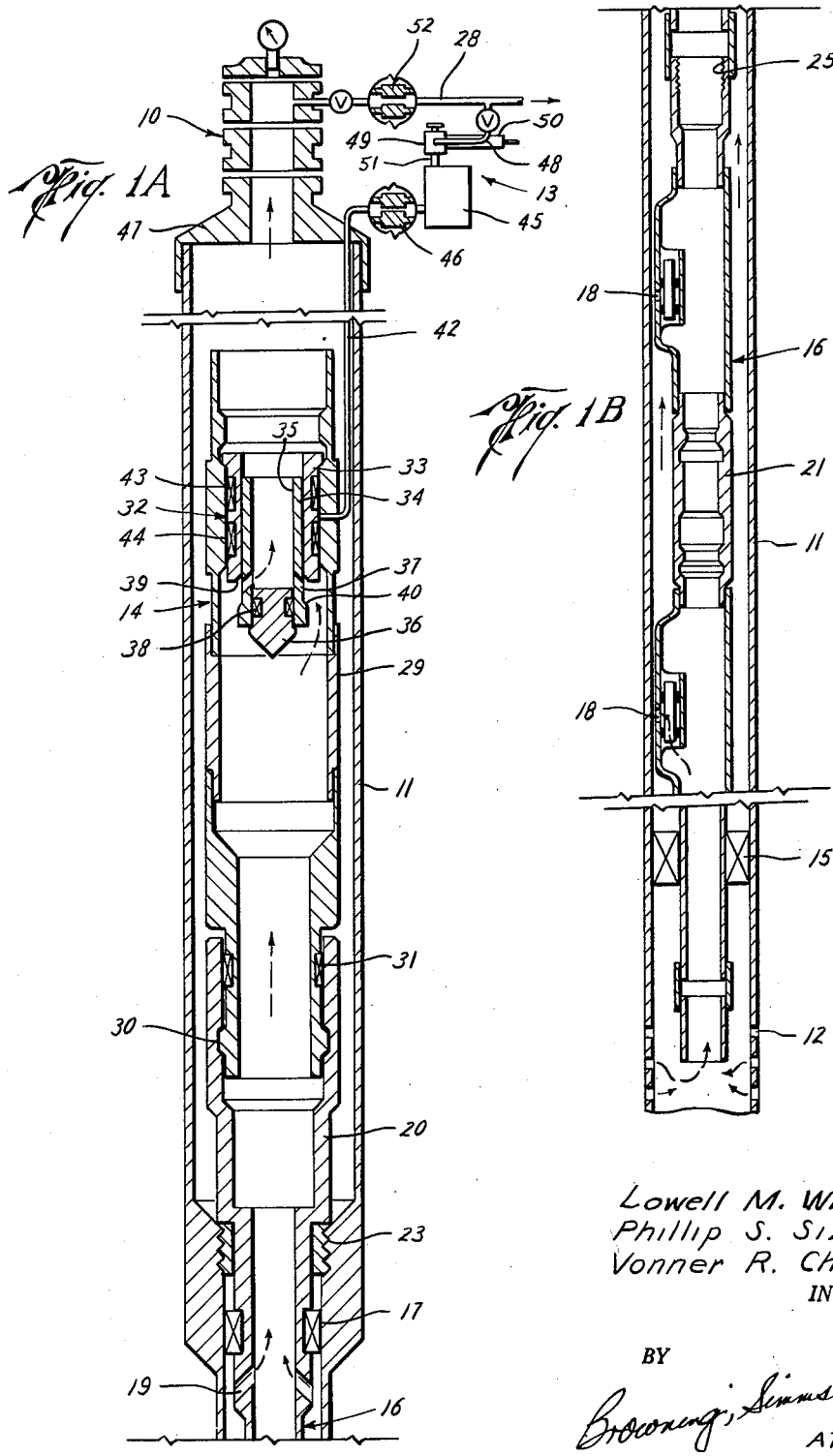

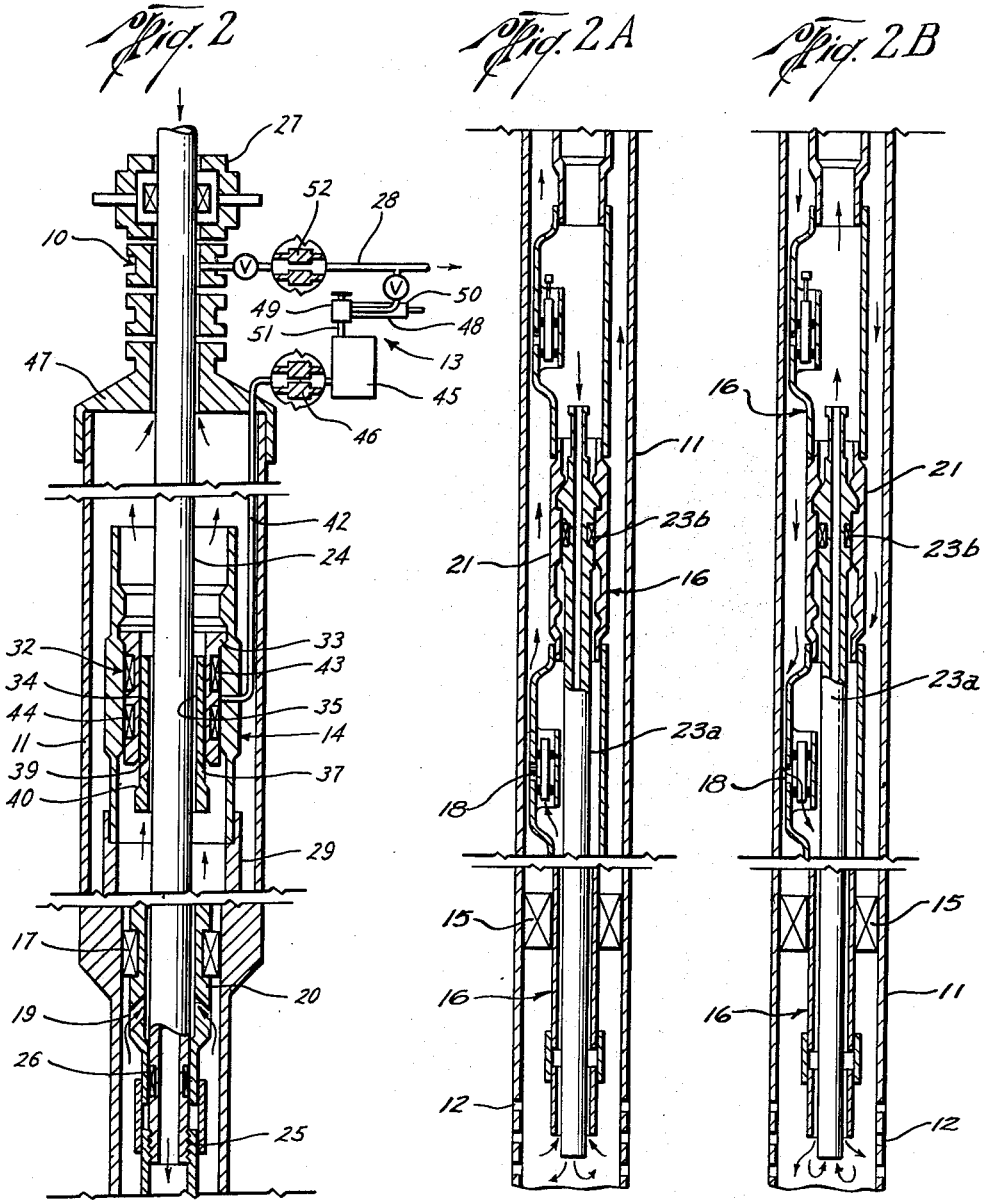

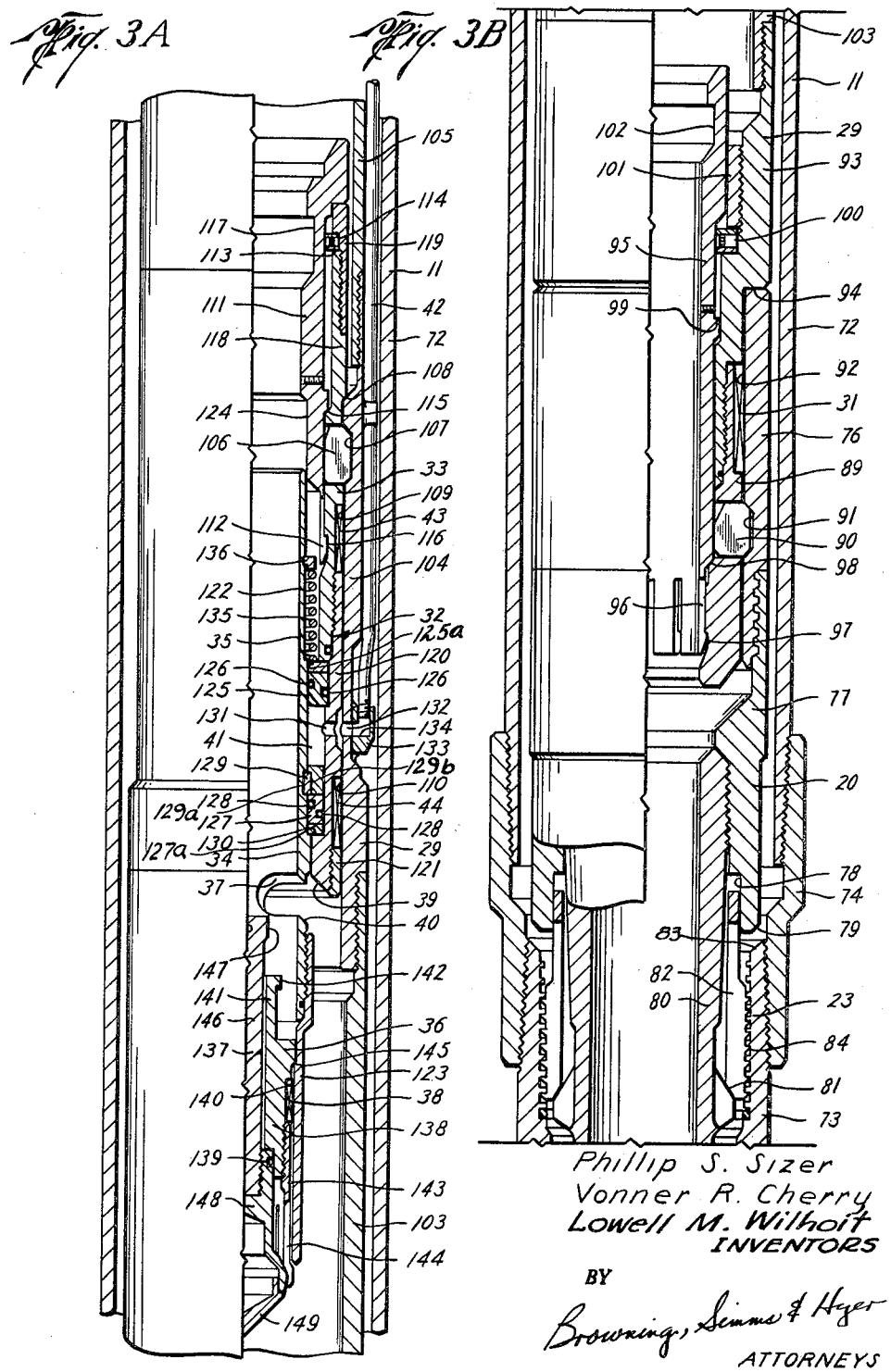

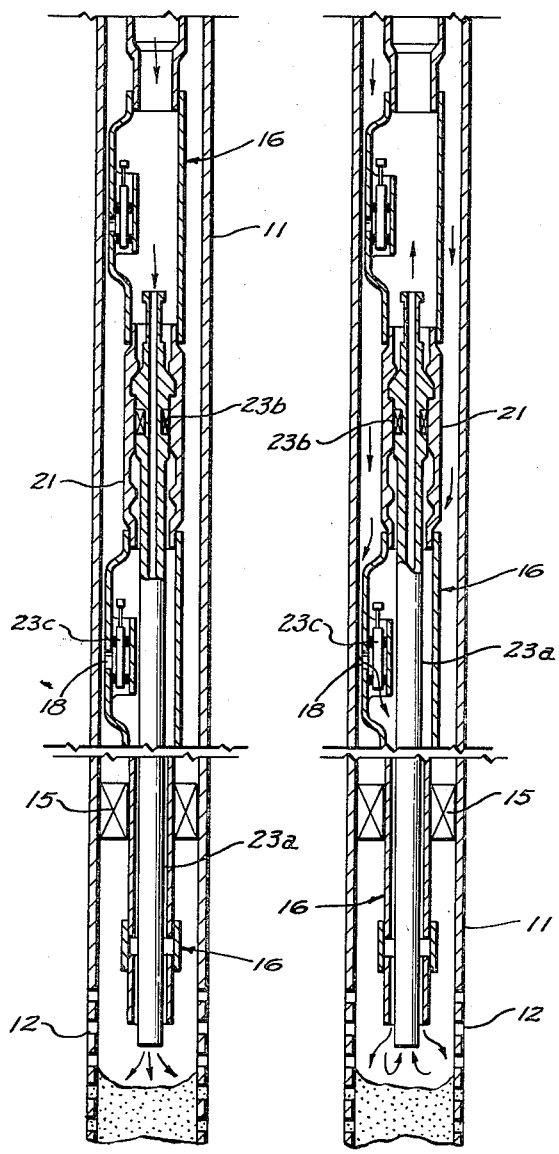

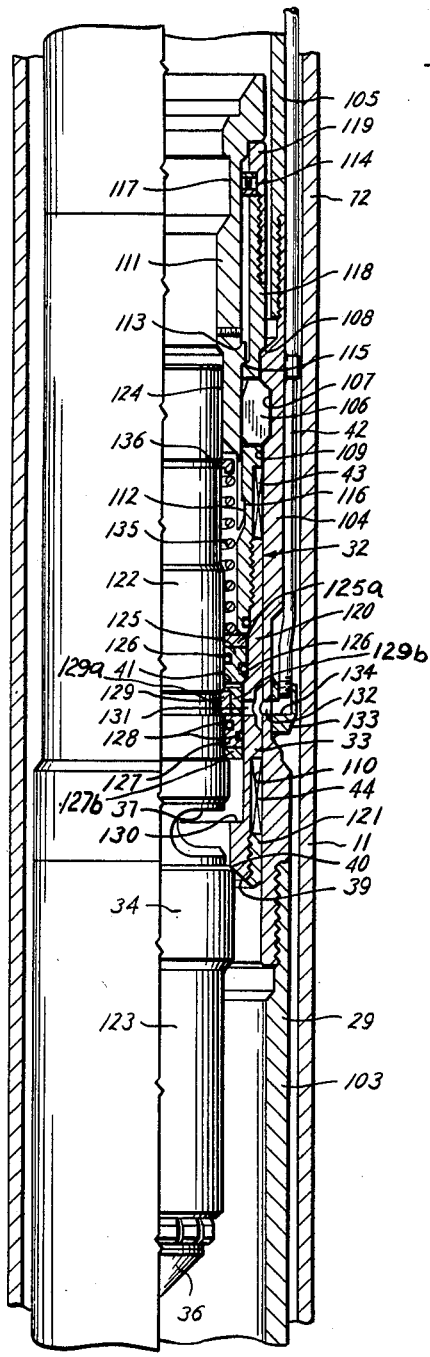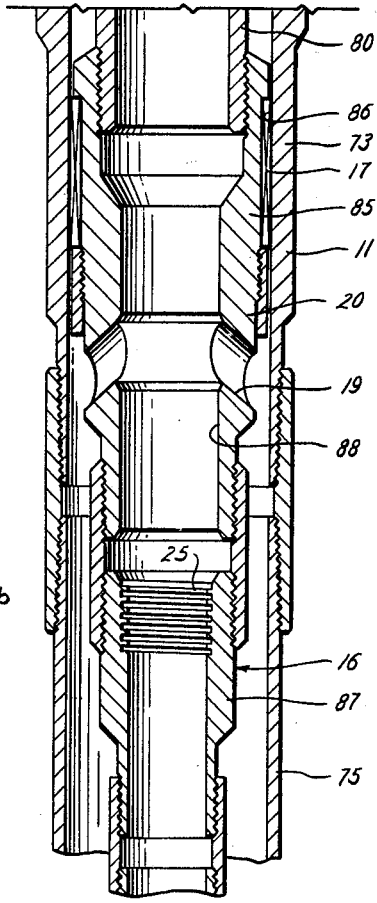

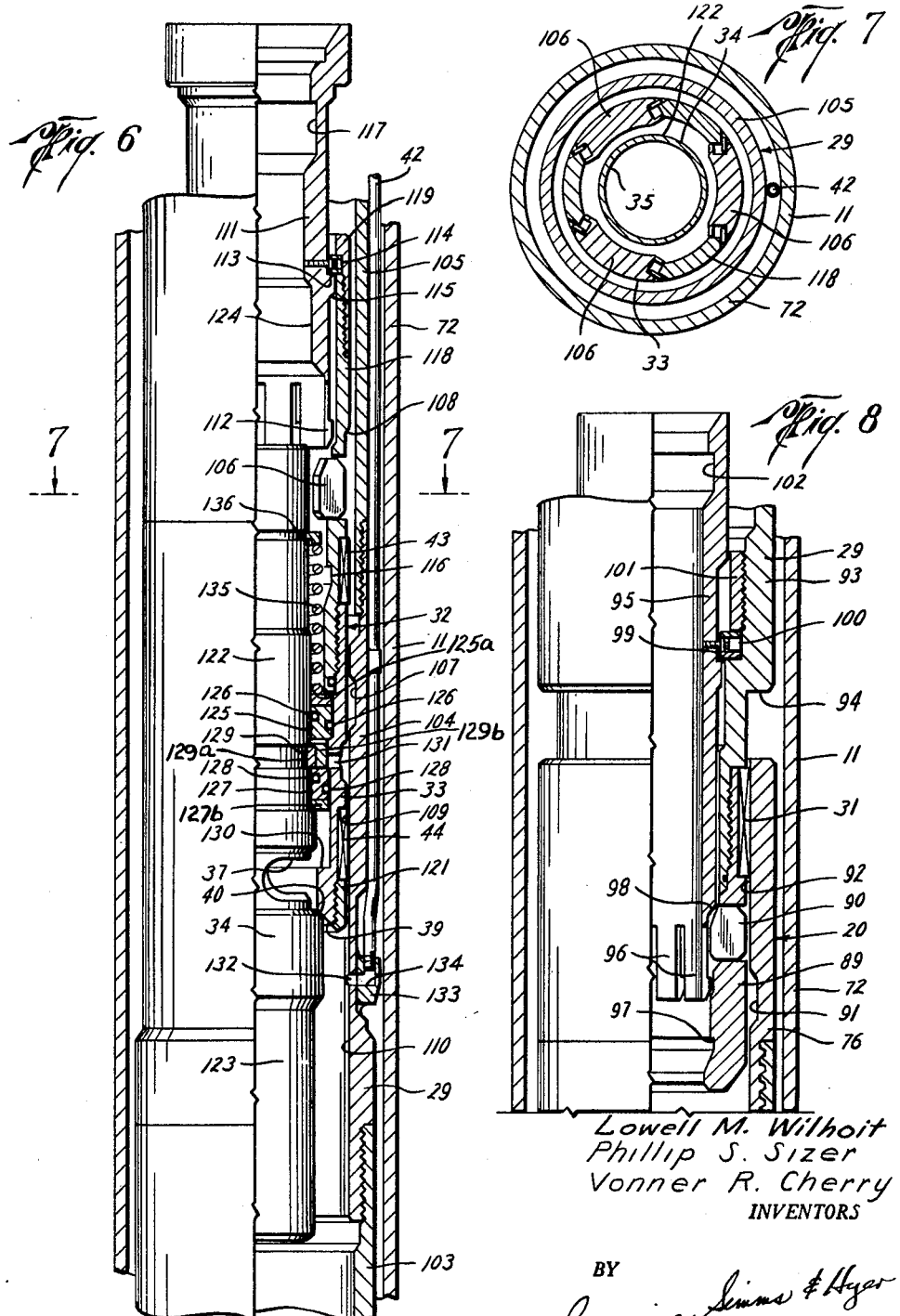

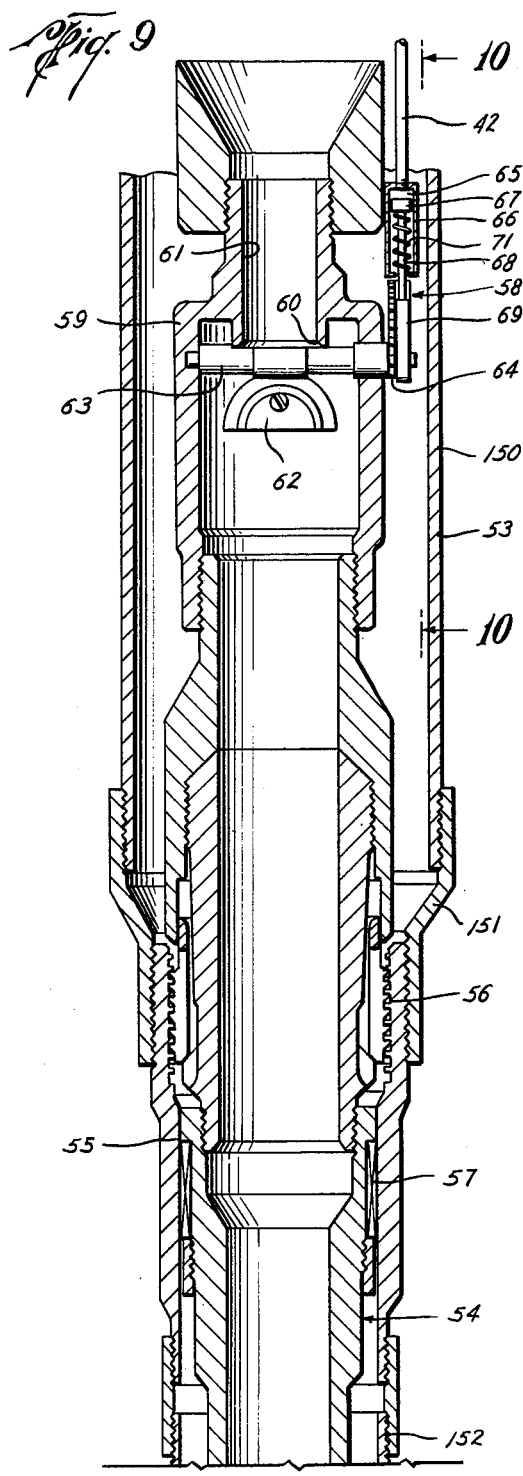
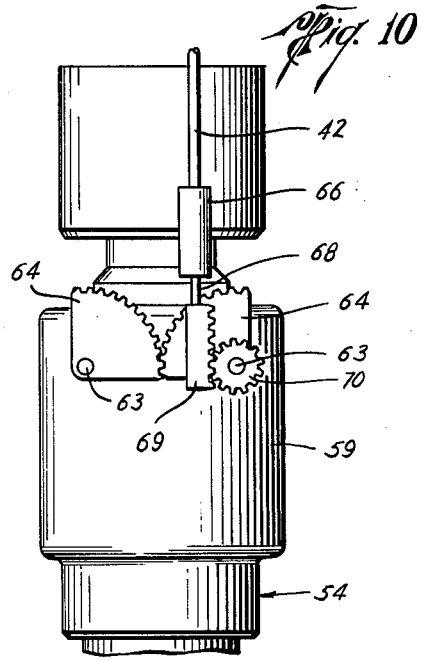
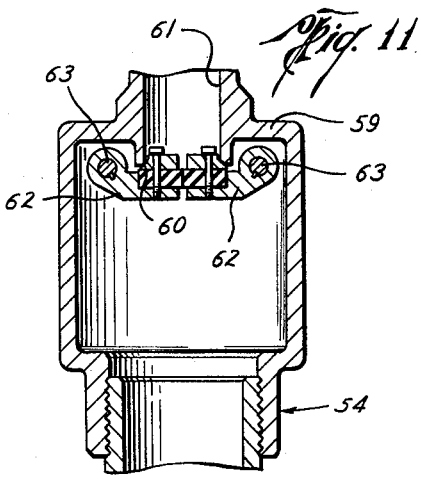
Lowell M. Wilhoit
Phillip S. Sizer
Vonner R. Cherry
INVENTORS

3,157,233
APPARATUS FOR CONTROLLING FLOW WITHIN A WELL
Phillip S. Sizer, Dallas, Tex., Vonner R. Cherry, Anaco, Anzoategui, Venezuela, and Lowell M. Wilhoit, Dallas, Tex., assignors to Otis Engineering Corporation, Dallas, Tex., a corporation of Delaware
Filed June 20, 1956, Ser. No. 592,691
17 Claims. (Cl. 166—224)

This invention relates broadly to the control of flow within a well. In one of its aspects, it relates to apparatus especially well suited for controlling flow at a subsurface level within a permanently completed well. In another of its aspects, this invention relates to an improved safety device for automatically shutting off flow within a well conduit in response to a predetermined pressure condition above such level. In still another of its aspects, this invention relates to a novel valve usable with such safety device which is operable by means of a control fluid under pressure and separate from that being controlled; and, more particularly, to a valve especially well suited for subsurface use wherein the control fluid therefor is contained at ground level. Still further aspects of this invention are concerned with novel methods employed in the production and reworking of a well having a high rate of flow capacity; and, more particularly, a well having the aforementioned subsurface flow control.

This application is a continuation-in-part of our copending application Serial No. 483,318, filed January 21, 1955, and entitled "Flow Control Apparatus."

It is an object of this invention to provide apparatus for shutting off flow at a subsurface level within a well conduit of a permanently completed well in response to a predetermined pressure condition above said level.

Another object of this invention is to provide an improved safety device for automatically shutting off flow at a subsurface level within a well conduit upon damage to the wellhead or appurtenant equipment above said level and, more particularly, to such a device which will accommodate a greater rate of flow than prior devices.

Yet another object is to provide a safety device of the character described in the foregoing object which is particularly well adapted for use in a well conduit at subsurface level wherein the pressure responsive control medium therefor is disposable at surface level.

A further object is to provide a subsurface safety valve having a member selectively operable to provide a substantially full opening through the valve, whereby well tools and the like may be run therethrough.

A still further object is to provide, in a well having a subsurface flow control, a method of isolating both said subsurface flow control and surface flow control mechanism at the wellhead from the high squeeze pressures to which the production zone is subjected; and, more particularly, to accomplish such isolation in a well having the aforementioned high rate of flow.

Still another object is to provide, in the production and reworking of a well, a method of using the tubing-casing annulus for production as well as workover purposes so as to produce the well at a high rate of flow.

Other objects, advantages and features of this invention will be apparent to one skilled in the art upon a consideration of the written specification, the attached claims and the annexed drawings.

In the drawings wherein like reference characters are used throughout to designate like parts:

FIGS. 1A and 1B are successive diagrammatic sectional views of part of a well capable of an extremely high rate of production flow and provided with the novel safety device of the present invention for automatically shutting off such flow at a subsurface level in response to damage or destruction to the well equipment thereabove;

FIG. 2 is a diagrammatic sectional view of part of the well of FIGS. 1A and 1B with a cementing tube extended through the substantially full opening in the valve of the safety device and connected and sealed to the tubing to provide a means of circulating fluid from the wellhead to the lower end of the tubing and back;

FIGS. 2A and 2B are sectional views of a continuation of the lower end of the well of FIG. 2 and illustrating, respectively, the flow of cement downwardly through the tubing for the performance of a Bradenhead type squeeze and the reversal of flow downwardly through the annulus and upwardly through the tubing;

FIGS. 2C and 2D are views similar to FIGS. 2A and 2B, except that they illustrate a packer type squeeze and reversal;

FIGS. 3A and 3B are successive enlarged sectional views of the subsurface portion of the safety device installed within the well of the foregoing figures, FIG. 3A showing the removable valve of the safety device in open position to permit flow therethrough;

FIG. 3C is a sectional view of the lower portion of the well beneath that shown in FIG. 3B;

FIG. 4 is a sectional view similar to FIG. 3C of the connection and seal of the cementing tube with the tubing, as shown in FIG. 2;

FIG. 5 is a view partly in section and similar to FIG. 3A, but with the valve closed to flow therethrough;

FIG. 6 is a view similar to FIGS. 3A and 5, but with the valve thereof in running-in position with respect to a removable landing nipple;

FIG. 7 is a cross-sectional view of the valve of FIG. 6, taken substantially along broken line 7—7 of FIG. 6;

FIG. 8 is a view similar to the upper portion of FIG. 3B, but showing the removable landing nipple in running-in position with respect to a hold-down and seal nipple assembly of the tubing;

FIG. 9 is a sectional view of a well similar to that of the preceding figures provided with an alternative type of safety device and with the valve of such device in open position;

FIG. 10 is a side elevation of the valve, taken substantially along line 10—10 of FIG. 9, and shows a pressure responsive operator for the valve; and FIG. 11 is a sectional view of the valve of FIG. 9 taken at 90° thereto and showing the valve in closed position.

According to the present invention, there is provided apparatus which includes a valve for shutting off flow at a subsurface level within a well conduit and which is provided with a substantially full opening therethrough to accommodate well tools. The valve is adapted to be closed by a control mechanism at surface level, and more particularly by a mechanism which includes a source of fluid under pressure for actuating a pressure responsive means connected to the valve. The flow connection between such source and the pressure responsive means is preferably provided with a choke to insure a uniform effect of pressure change on such means.

A well structure is employed in this particular embodiment of the invention which will flow a single production zone at an extremely high rate, and at the same time permit control of such flow at a subsurface level by means of only a single valve as the one embodying a part of this invention. For this purpose, the valve is provided with a flow passage having maximum capacity in its open position. The valve is also preferably constructed with its sealing surfaces protected by disposal out of the direct flow path therethrough and, for this purpose, is provided with a plug to provide an imperforate barrier across the flow passage therethrough. However, in accordance with a previously mentioned aspect of this invention, the plug is made removable by wire line or the like such that a substantially full opening is provided through the flow passage to accommodate well tools.

According to another novel concept of this invention, the fluid control medium for closing the valve is in turn automatically responsive to a predetermined pressure condition within the well above the subsurface level. Thus, upon damage or destruction to the well above this level, the flow control apparatus serves as a safety device for automatically shutting off flow therein. For this purpose, and in harmony with the maximum flow passage and full opening through the valve, the automatic pressure responsive means for the control fluid is located at surface level and, in this embodiment of the invention, comprises a pilot valve having a fluid connection between the flow wing on the wellhead and the source of control fluid. Furthermore, such a source of control fluid separate from that being controlled enables the valve to be opened without pumping down through the well conduit in which it is disposed.

The valve especially well suited for use with the subsurface safety device of this invention includes a movable valve member having a pressure responsive surface communicating with the flow connection from the source of control fluid for urging said member to open position. The valve member is urged to closed position by a resilient means adapted to be overcome by the pressure responsive means for opening the valve. Inasmuch as the pressure responsive means for opening the valve is resisted by the afore-mentioned resilient means, the effect of a change in pressure areas on the valve member, as it is unseated, is minimized and impact upon opening thereby reduced. On the other hand, closing impact is lessened because the valve starts to close as soon as the resilient means begins to overcome the pressure responsive means.

The flow connection with the pressure responsive means is preferably carried by a landing nipple for the valve and such nipple is made removable from the well such that the flow connection can be repaired or replaced.

Control over an extremely high rate of production flow is enabled by a well structure which includes a well tubing packed off within a casing beneath the subsurface level and having openings therethrough beneath said packing to provide a flow path for the producing formation in the tubing-casing annulus coextensive with that through the tubing. Above the joinder of such flow paths, the tubing is provided with means for landing and sealing with the landing nipple for the valve.

In accordance with still further novel concepts of the present invention, there is provided a tubing which may be extended through the well tubing such that an imperforate length thereof may be sealed off above surface flow control means at the well head and below the uppermost openings or ports in the well tubing so as to by-pass the subsurface as well as the surface flow controls and said openings. In this manner, there may be provided for workover purposes two separate flow paths within the well between said joinder and the well head. Additionally, upon closing of the previously mentioned circulating ports to flow upwardly therethrough, this tubing serves to isolate both flow controls as well as the tubing-casing annulus from the high pressures involved in a packer type squeeze.

Referring now particularly to the above-described drawings, there is shown in FIGS. 1A and 1B a well which includes conventional well head equipment 10 at surface level and a casing 11 extending downwardly into communication with a producing formation through perforations 12. Disposed at surface level adjacent the well head 10 is a control system, designated in its entirety by the numeral 13, which will be described more particularly in connection with the improved safety device, which device is designated in its entirety by the numeral 14 and shown in FIG. 1A in position within the well for controlling flow of production therethrough.

Disposed within the casing and packed off as at 15 toward its lower end is a section of tubing 16 through which production may be flowed. However, this tubing section is also packed off as at 17 at a point within the casing above the lower packing 15 and below the safety device 14. Between the packings 15 and 17, the tubing section 16 is provided with a number of openings or ports 18 and 19 communicating the interior of the tubing section with the tubing-casing annulus. The openings 18 may be provided by ports in a series of conventional gas lift mandrels as shown and described, for example, on page 3988 of the 1955–56 Edition of the Composite Catalog of Oil Field and Pipe Line Equipment, which mandrels make up a considerable portion of the tubing section, while the openings 19 constitute ports within a hold-down and seal assembly portion 20 of the tubing section which carries packing 17, said latter ports comprising the uppermost openings through the tubing section. It is noted that a commercial type landing nipple 21 having a substantially full opening therethrough, such as the Otis Type "S" shown on page 3990 of the Composite Catalog, may be provided in the tubing section intermediate the gas lift mandrels for locating various tools in a manner and for a purpose well known in the industry.

From the foregoing, it is apparent from FIGS. 1A and 1B that an extremely high rate of production flow is possible through the above-described subsurface well equipment. That is, production from the formation through the perforations 12 may flow for a considerable length of the well through not only the tubing but also the tubing-casing annulus, as shown by the broken arrows of FIGS. 1A and 1B. Also, it will be appreciated that the flow through both these paths is joined at the openings 19 such that it may be controlled by a single safety device as at 14. In a manner to be described more fully hereinafter, the hold-down and seal assembly 20 is landed and locked in place within an enlarged portion of the casing by a latching device indicated diagrammatically at 23, and to be described more fully hereinafter.

Referring to FIGS. 2A to 2D, it will be seen that in accordance with conventional workover practices, an extension hanger 23a, such as the Otis Type "S" illustrated on pages 3988–9 of the aforementioned Composite Catalog, may be landed and sealed off as at 23b within the nipple 21 next above circulating ports 18 next above packer 15. Additionally, however, and in accordance with this invention, a section of the safety device 14 is removed, as shown in FIG. 2 and as in a manner to be described hereinafter, to permit a tube or tubing 24 to be extended through the well tubing 16 and sealed off within the wellhead 10 by a blowout preventer valve 27 or the like disposed above the conventional control mechanism at surface level connecting with flow wing 28. This tubing 24 is connected at its lower end to the well tubing at 25 (see FIGS. 1B and 4) and sealed with respect thereto at 26 by O-rings or the like beneath ports 19.

Thus, the imperforate length of tubing 24 intermediate the seals at 27 and 26 by-passes both the surface and subsurface flow controls as well as ports 19 and cooperates with extension hanger 23a to establish two separate and concentrically arranged flow paths within the conduit which connect the well head and lower end of the well tubing adjacent the ports 12 at the production zone.

Referring specifically to FIGS. 2 and 2A, it will be seen that a Bradenhead type squeeze may be performed by pumping cement down through the tubing 24 and extension hanger 23a, as shown by the downwardly directed solid arrows, from the lower end of which it is forced into openings 12, as well known in the art. In this type of cement squeeze, the pressure is not so great that the casing must be isolated therefrom so, as shown in FIG. 2A, the mandrel next above packer 15 is left empty to permit the passage of cement therethrough and into the annulus, as shown by the upwardly directed solid arrows. Subsequent to the squeeze, circulation of fluid is reversed through the separate flow paths, as will be understood from the solid arrows of FIG. 2B and for a purpose which is not pertinent to the present invention.

As previously mentioned, the pressures encountered in packer type squeezes are such that the casing must be isolated therefrom. Thus, as illustrated by FIGS. 2C and 2D, a suitable check valve 23c may be landed within the mandrel just above packer 15 for preventing flow upwardly therethrough and out of port 18 while permitting flow downwardly therethrough. Thus, as illustrated by the solid arrows of FIG. 2C, cement pumped downwardly through the tubing 24 and hanger 23a and into the production zone ports 12 may be held and the tubing-casing annulus isolated therefrom. On the other hand, the check valve 23c permits the reversal of flow shown by the solid arrows of FIG. 2D.

In accordance with the present invention, the tubing 24 also serves to isolate both the surface and subsurface flow controls from the high squeeze pressure. That is, as can be seen from FIG. 2, the valves and other parts of both controls which might otherwise be damaged by such pressure, is by-passed by the tubing 24.

The safety device 14, as it is shown diagrammatically in FIGS. 1A, 1B and 2, includes a tubular member comprising a landing nipple 29 which, as shown, is releasably locked at 30 within the hold-down and seal assembly 20 and sealed with respect thereto at 31. A valve, designated in its entirety by the numeral 32, includes a body or casing 33 releasably and sealably lockable within and removable from the landing nipple and a valve member 34 movable within said body between open and closed position.

As shown in FIG. 1A, the valve member 34 is provided with a tubular part movable longitudinally within the body 33 and having a substantially full opening or passage 35 therethrough which is closed by a plug 36 disposed within the passage beneath ports 37 in the valve member and sealed thereto at 38 to provide an imperforate barrier to flow therepast. The body 33 is provided with a tapered annular seat 39 with which a sealing surface 40 on the movable valve member 34 is adapted to cooperate in the closed position of the valve. As it is shown in FIG. 1A, the valve is open and flow therethrough is indicated by the broken arrows as passing through the ports 37 and upwardly through the flow passage 35 to the well head 10. However, it will be understood that with the valve closed, as shown in detail in FIG. 5, the surface 40 seats upon the valve seat 39 to prevent passage of fluid within the well conduit through the valve member with, of course, the plug 36 landed, as shown.

It will be understood that the valve member 32 is thus operable at the subsurface level to either shut off or permit production flow at the high rate indicated. More particularly, it controls such flow through a well conduit composed of the tubing section 16, landing nipple 29, and valve body 33. With each of the foregoing made up concentrically and sealed with respect to one another, the well conduit serves as conventional production or well tubing.

In accordance with one of the novel concepts of this invention, the plug 36 is releasably lockable within and removable upwardly through the valve flow passage to provide a substantially full opening through the valve through which well tools may be passed into the well conduit beneath said valve. An example of such an installation is shown in FIG. 2 wherein the movable plug or head 36 has been removed and the cementing tube 24 passed therethrough.

Pressure responsive surfaces on the movable valve member 34 and the fixedly landed body 33 define a variable capacity pressure chamber therebetween which is clearly shown in FIGS. 3A and 5 and designated thereon by the reference character 41. Although, for the purposes of clarity, this chamber is not shown on the diagrammatic views of FIGS. 1A and 2, there is shown a flow connection thereto in the form of a pipe 42 which is extended downwardly within the tubing-casing annulus from the fluid control system 13 at surface level. More specifically, there is provided a fluid-tight connection between the flow connection 42 and the pressure chamber 41 by means of seals 43 and 44 on the valve member 33 for sealing with the landing nipple above and below, respectively, the connection of pipe 42 with pressure chamber 41. Such seals not only make this connection fluid-tight, but also provide a seal between the valve body and the landing nipple.

It is preferred that the connection 42 be filled at all times with a liquid rather than a gas, such as air or nitrogen, as a quicker hydraulic reaction may thus be obtained through the liquid column. Gas or air should be used only as a means of maintaining the desired pressure and offsetting any loss of fluid through leaks in the system.

At surface level, the pipe 42 connects with a surge or volume tank, designated in its entirety by the numeral 45, which contains control fluid under any desired pressure. In this manner, fluid under a suitably high pressure may be exerted upon the pressure responsive means of the valve member within the pressure chamber 41 for moving said valve member to an open position. It will be understood from the diagrammatic views that when the valve is closed such fluid control means acts against the pressure beneath the valve member while with the valve open it acts against the frictional force of the fluid flowing through the valve as well as the force of such flow acting against an opposite pressure responsive surface of the valve member.

As shown on the blow-up in FIG. 1A, as well as on FIG. 2, a flow bean 46 is interposed in the flow connection 42 between the source of control fluid 45 and the pressure chamber 41. This restriction in the flow line insures an even and uniform distribution of pressure between the source of control fluid and the pressure chamber 41, whereby impact upon movement between open and closed position of the valve member is substantially reduced. As well, it can be seen that the flow connection 42 is carried by the removable landing nipple 29 and is extended upwardly through the lower flange 47 of the flow bean such that, upon removal of the well head, the flow connection can be removed with the landing nipple for repair and replacement, as desired. In fact, this is one of the principal reasons for providing a removable landing nipple for the valve 32.

It will be understood from the foregoing that the above-described apparatus provides a means for controlling flow through a well conduit at a subsurface level therein by means of a control system disposed at surface level and a valve member within the conduit at said subsurface level, which flow control means is provided with a substantially full opening therethrough whereby well tools and the like may be run therethrough. It will be further appreciated that with this arrangement the valve member may be reopened by either of two methods. According to one method, fluid under pressure may be pumped down through the well conduit to force the valve open by exerting pressure above the removable head 36. However, an alternative method of reopening the valve is provided by the apparatus of the present invention inasmuch as the pressure of the control fluid within source 45 may be increased sufficiently to force the valve open by exerting sufficient pressure upon the pressure responsive means of the valve member 34. It is obvious that this latter means of opening the valve obviates the necessity of forcing fluid down through the well conduit and could be used to great advantage.

The remainder of the surface equipment comprises the means for automatically shutting the valve member in response to a predetermined pressure condition within the well conduit above the valve member. More particularly, this equipment is operable to automatically shut off the flow within the well conduit at a subsurface level in response to damage or destruction of the well equipment between said subsurface level and the surface which will, of course, reduce the pressure therein. The previously mentioned connection between the flow wing 28 and the control means 13 for the safety device is provided by a flow line or pipe 48 which extends between the flow wing and a pilot valve 49. As shown in the diagrammatic views of FIGS. 1A and 2, the pilot valve 49 is provided with a low pressure type pilot 50 and is connected by a flow line or pipe 51 to the source 45 of control fluid. Also, as shown in the figures, a relatively large flow bean 52 is provided within the flow wing 28 for evening out of the pressure within the flow wing resulting from the passage of fluid therethrough. Specifically, this flow bean is for the purpose of improving the accuracy of the control exerted by the pilot valve 49 upon the source 45 and is for that purpose disposed between the well head and the flow line 48. Suitable valve control may be connected in the flow wing 28, as well as in the flow line 48, as shown on the drawings.

The function of the pilot valve 49 is to provide a control responsive to pressure of the fluid within the well conduit above the subsurface level, and flowing outwardly through the flow wing 28, for exhausting the control fluid within the source 45 when the pressure of such controlled fluid reaches a predetermined figure. Specifically, when the well equipment above the subsurface level of the valve is damaged or destroyed such that the pressure of the fluid within the well conduit drops a predetermined amount, a pressure responsive member within the pilot valve is operable to actuate the low pressure pilot 50 in a manner to exhaust fluid within the source 45 connected to such pilot valve and thus reduce the pressure thereof. It should be understood, however, that although the particular arrangement shown, of a pilot valve and a low pressure pilot therefor, is preferred, other suitable pressure responsive means may be used.

However, for the purpose of this invention, reference is had to the Otis Type "M" pilot valve which is shown and described on page 4010 of the aforementioned Composite Catalog, which valve has been found especially well suited for the purposes of this invention. Further reference is had to page 4011 of this same catalog for a complete disclosure of a suitable low pressure pilot such as is shown at 50 in the drawings. The externally threaded cylinder shown in the catalog illustration at the lower end of the pilot valve is connected to the flow line 51 for communication with the source of control fluid 45, and the low pressure pilot 50 is connected to the pilot valve at one of the internally threaded connections of the valve body. Of course, since this particular application of the system merely requires a control responsive to a lowering of pressure, the other internally threaded connection of the pilot valve body, normally for use with a high pressure pilot, may be plugged in any suitable manner. It will be understood, however, that the system is readily adaptable for the provision of additional controls in which said other connection may be used.

The flow line 48 from the flow wing 28 is, of course, connected to the external opening of the pilot valve communicating with the low pressure pilot such that the pressure of the fluid within the flow wing 28 will act upon the plunger of such pilot valve. As will be apparent from this description, when this pressure within the flow wing 28 reaches a predetermined low figure, the low pressure pilot 50 will be actuated to exhaust such fluid whereby the plunger is permitted to rise and fluid within the source 45 is exhausted outwardly through the side exhaust port shown on the illustrated pilot valve. Since each of this type pilot valve and the low pressure pilot are illustrated so adequately in the aforementioned catalog, and further since equivalent apparatus may be used, diagrammatic representations of same are thought adequate for the purposes of this application.

The alternative device shown in FIGS. 9 to 11 is productive of many of the advantages enabled by the above-described preferred embodiment. The surface equipment for such apparatus, including the well head and fluid control system, may be identical to that previously described. As well, a casing 53 is extended downwardly to the producing formation and a tubing section 54 is disposed within the casing in a manner to produce the extremely high rate of flow previously described. More particularly, this tubing section includes a hold-down and seal nipple 55 having a "no-left-turn" latching device 56 and seal means 57 cooperable with a special assembly of the casing to confine the flow of production fluid within the well conduit through the valve 58. Reference is made to page 523 of the aforementioned Composite Catalog for a more complete showing of such a latching device.

An upper portion of the tubing section includes a body or casing 59 for the valve which is connected to the nipple 55. This body is provided with an annular seat 60 surrounding a flow passage 61 therethrough, and semi-circular valve members 62 are pivotally mounted upon pins 63 journaled in the body for seating upon seat 60 as well as adjacent one another, as shown in FIG. 11, in the closed position of the valve. Sector gears 64 are connected to the pins exteriorly of the valve body and mesh with one another to provide uniform opening and closing movement of the valve members.

A valve of this construction is shown and described in Patent No. 2,375,432 to Miller et al. and does not per se constitute a part of the present invention. However, in accordance with the novel concepts of this invention, a valve of this type has been rendered adaptable for subsurface use. In particular, it forms a part of a device for controlling flow at a subsurface level within a well conduit and operable by the surface controls previously described. Furthermore, it is usable in a manner to provide a substantially full opening through its flow passage 61 for accommodating well tools and the like.

For this purpose, the flow line 42 is extended downwardly from the surface fluid control system for connection with a variable capacity pressure chamber 65 made up of a cylinder 66 fixed to the valve body and a piston 67 operable in the cylinder. A rod 68 on the piston provides a power connection between this pressure responsive means and the valve members 62 by means of rack 69 and pinion 70.

As can be seen from the drawings, the pressure responsive means 67 is operable to urge the valve members to open position. A coil spring 71 is disposed within cylinder 66 between the piston 67 and end of such cylinder to urge the valve members to closed position. Thus, as in the case of the previously described preferred embodiment, the valve 58 is opened by exerting a force on the piston sufficient to overcome the resilient means 71, while the surface control equipment may be made automatically operable to close the valve and shut off flow within the conduit at the subsurface level in response to a predetermined pressure condition thereabove.

Returning now to a detailed description of the preferred embodiment, which has been described chiefly in connection with the diagrammatic views of FIGS. 1A, 1B and 2, it can be seen from FIGS. 3A and 3B, that the upper portion of the casing is formed from large diameter pipe 72 which is connected at its upper end to the lower flange 47 of well head 10 in a conventional manner and at its lower end to a hold-down and seal nipple 73 by means of a reducing coupling 74. As shown in FIGS. 3C and 4, a string of smaller diameter pipe 75 may be connected to and extended downwardly from nipple 73.

As previously mentioned, the tubing section 16 includes at its upper end a hold-down and seal assembly 20. As shown in FIG. 3B, this assembly includes an uppermost nipple 76 adapted to receive the lower end of landing nipple 29, in a manner to be described, and threadedly connected at its lower end to a sub 77 having a recess 78 formed about its inner periphery and a downwardly facing shoulder 79 on its exterior. A tubular part 80 is connected to internal threads on the sub 77 and is provided with an upwardly facing expander 81 upon which a downwardly facing shoulder on latching ring 82 is adapted to ride. As shown in FIG. 3B, this ring is guidably contained between the recess in the sub and the tubular part 79.

The hold-down nipple 73 is provided with a shoulder 83 oppositely facing to shoulder 79 on sub 77 in position to land the same as tubing section 16 is lowered into position within the well casing. Beneath the shoulder 83 are square threads 84 for cooperation with teeth on ring 82 guidably carried about the hold-down and seal assembly. The lower faces of the teeth on ring 82 are tapered such that as the assembly 20 is lowered into place, the teeth will ride down over threads 84. However, when shoulder 79 lands upon shoulder 83, an upward pull may be exerted on the tubing section. When this is done, the expander 81 forces the guidably mounted ring outwardly into the threads 84, as shown in FIG. 3B, for holding the tubing section down against upwardly directed pressure thereon.

The above-described hold-down apparatus has been previously described as a "no-left-turn" latching device 23, and reference has also been made in connection with FIG. 9 to a publication of same. Obviously, equivalent apparatus may be used in each case.

A packer and side port nipple 85 are threadedly connected to the lower end of tubular part 80, as shown in FIGS. 3C and 4. This nipple carries the packing 17 for sealing engagement with a sealing surface 86 on the hold-down and seal nipple 73 when the tubing section is properly locked in place within the casing. As well, this nipple 85 is provided with the ports 19 communicating the tubing-casing annulus with the interior of the tubing beneath the seal means 17.

A sub 87 coupled to the lower end of nipple 85 is provided with the square threads 25 to which the cementing tube may be attached, as shown in FIG. 4. The O-rings 26 are carried on the tube for sealing with a sealing surface 88 on nipple 85 beneath ports 19. The remainder of the tubing section 16 may be composed, as previously described, of suitable tubular members which may include gas lift mandrels, landing nipples, and the like.

The means 30 for releasably locking landing nipple 29 within the tubing section 16, and particularly the uppermost nipple 76 thereof, does not constitute a part of this invention and will not be described in great detail. It will be noted, however, from FIG. 3B that a lowermost part 89 of the landing nipple 29 carries lugs 90 for radial movement with respect thereto into locking position within complementary recesses 91 in the inner bore of nipple 76. This part 89 also carries the packing 31 for sealing engagement with sealing surface 92 on nipple 76 when the landing nipple is locked in position, as shown in FIG. 3B.

The packing 31 is held in place by a tubular part 93 which is threadedly connected to part 89 and provided with a downwardly facing shoulder 94 for landing upon the upper edge of nipple 76 for locating the lugs 90 opposite recesses 91. An expander ring 95 (not shown in FIG. 1A) is received within the tubular parts 89 and 93 and is slidable from a position as shown in FIG. 8 wherein the landing nipple 29 is being run into the tubing section, to the position shown in FIG. 3B, wherein the lugs 90 have been forced outwardly into locking position within the recesses 91.

In this locked position, fingers 96 on the lower split end of ring 95 engage beneath and are held by the collet 97 of part 89. As shown in the drawings, the upper portion of the ring is enlarged somewhat and a tapered shoulder 98 is provided therebelow, such that while the fingers 96 do not expand the lugs 90 in the position of FIG. 8, downward movement of the ring relative thereto will cause shoulder 98 to ride over a tapered inner portion of the lugs and the enlarged portion of the ring will hold the lugs expanded.

The limit of this downward lug-expanding movement of the ring, as well as the locking position of fingers 96 within collet 97, is defined by engagement of shoulder 98 with an oppositely facing inner shoulder on part 89. The limit of upward movement is defined by the engagement of an external shoulder 99 on the ring 95 with a pin 100 fixedly carried on the part 93 by a member 101, which engagement is shown in FIG. 8.

The inner bore of the expander ring is provided with an inner recess 102 for attachment by a suitable wire line tool. It will be understood that as the landing nipple 29 is lowered into the well by means of such a tool, the ring will be held in its upper position, as shown in FIG. 8. When, however, the shoulder 94 lands upon the nipple 76 and lugs 90 are positioned opposite recesses 91, the ring 95 will slide downwardly to expand the lugs into locking position, as shown in FIG. 3B. It will be further understood that the ring may be jarred upwardly out of lug-expanding position, whereby the lugs may be collapsed as shoulder 99 engages pin 100 and lifts tubular parts 89 and 93, and the landing nipple removed from the well.

Continuing upwardly along the landing nipple 29, and with reference now to FIGS. 3A, 5 and 6, a tubular part 103 is threadedly connected between part 93 and a nipple 104 in which the valve 32 is received, releasably locked, and sealed. Extending upwardly from the nipple 104 for any desired length is a tubular section 105.

The body of casing 33 of the valve is releasably locked within and removable from the nipple 104 of the landing nipple 29 in substantially the same manner in which the said landing nipple is locked within the tubing section 16. Thus, the body 33 carries lugs 106 for radial movement with respect thereto into and out of locking position within complementary recesses 107 in nipple 104. An external shoulder 108 on the body is landable upon an oppositely facing shoulder on the nipple to locate the lugs opposite the recesses, as shown in FIG. 3A. When the lugs are locked in place, the packings 43 and 44 are sealably engageable with sealing surfaces 109 and 110, respectively, on the bore of nipple 104 above and below the control fluid connection with pressure chamber 41. Thus, as previously mentioned, these seal means serve not only to seal off between the valve member and landing nipple but also about the above mentioned control fluid connection with the pressure chamber.

Still further, an expander ring 111 (not shown in FIGS. 1A and 2) is received within the valve body for slidable movement longitudinally with respect thereto between a running-in position, as shown in FIG. 6, and a lug-expanding position, as shown in FIGS. 3A and 5. The mechanism differs slightly at this point from that previously described in that in the running-in position, fingers 112 are actually disposed above the lugs in an upper position limited by the engagement of ring shoulder 113 with pin 114 fixed to the valve body. However, lowering of the ring 111 to its lug-expanding position defined by the engagement of ring shoulder 115 with an oppositely facing shoulder on the valve body moves the lugs outwardly and permits latching of fingers 112 in the collet 116 in the valve body. The solid portion of the ring above the fingers serves to securely hold the lugs expanded. As in the previously described mechanism, a recess 117 within the upper end of the ring permits its wire line manipulation.

In further detail, it can be seen that the valve body 33 is made up of a portion 118 in which the lugs 106 are carried and to the upper end of which is threaded a ring-like member 119 for securing the pin 114 in place. The packing 43 is held in place about the portion 118 by an upwardly facing shoulder on a tubular part 120 threadedly connected to the portion 118, while the packing 44 is held about such part by a ring-like member 121 threaded onto the lower end of tubular part 120.

The valve member 34 is best shown in section in FIG.

3A as comprising upper and lower threadedly connected tubular parts 122 and 123, respectively, which define the flow passage 35 therethrough. As can be seen from this figure, the upper part 122 is slidably received in the valve body as well as in a counter-bored portion 124 of the expander ring 111. As such, the flow passage through the valve member is substantially full opening with respect to the smallest inside diameter through the ring.

Ports 37 are provided through upper part 122, while plug 36 is releasably lockable within the flow passage through the lower part 123, in a manner to be described hereinafter. As can be seen from a comparison of FIGS. 5 and 3A, the valve member is movable longitudinally of the valve body 34 from a closed position in which sealing surface 39 seats upon valve seat 40 to an open position in which said surface is spaced therefrom to permit flow longitudinally within the well conduit to pass through the ports 37. It will be appreciated that with this construction, the surface 39 is out of the direct flow path such that the cutting action of fluid therepast is reduced to a minimum.

The variable capacity pressure chamber 41 is disposed in an annular space between the valve member and body and is defined at opposite ends by pressure responsive surfaces carried by each. The pressure responsive surface on valve body 33 is provided by a ring 125 which is carried by the body between a shoulder on part 118 and a back-up ring 125a adjacent an oppositely facing shoulder on part 120. O-rings 126 are provided on both the inner and outer diameters of the pressure-responsive ring 125 to provide a seal across the annular space between the valve member and body. A similar pressure-responsive ring 127 having O-rings 128 is carried by the valve member between a back-up ring 127a bearing upon a shoulder on tubular member 122 and a split ring 129 which is received within an annular recess 129a of member 122 and retained therein by a retainer ring 129b connected to the split ring by set screws (not shown). Obviously, if desired, the back-up ring 125a and pressure-responsive ring 125, as well as back-up ring 127a and pressure-responsive ring 127, could be made integral. Pressure fluid between O-rings 126 and 128 will obviously tend to separate the pressure-responsive surfaces and open the valve. As illustrated in FIGS. 5 and 6, the opposing surfaces of part 125 and retainer ring 129b above ring 127 are spaced apart a slight amount. Opening movement of the valve member is limited by engagement of a portion beneath ring 127 with an upwardly facing shoulder 130 on part 120 of the valve body.

The tubular part 122 is imperforate with respect to this chamber 41 such that, with the sliding seals previously described, the control pressure fluid within the chamber is separate from the fluid controlled by passage through the valve. Control fluid is introduced into the chamber from the flow line 42 through ports 131 and 132 in part 120 of the valve body and nipple 104 of the landing nipple 29, respectively. The outer periphery of nipple 104 is flattened adjacent the port 132 to receive a manifold 133 welded or otherwise secured thereto with a passage 134 therethrough communicating with the port 132 as well as a connection for the lower threaded end of the flow line 42. Thus, this line is carried by the landing nipple and, for purposes previously described, is removable therewith.

While the introduction of control fluid into the chamber 41 between seals 126 and 128 will urge the valve member to open position by expanding the chamber and moving the pressure-responsive means downwardly, a resilient means in the form of a coil spring 135 is provided for urging the valve member closed. For this purpose, the spring is received about upper tubular part 122 of the valve member between a stop ring 136 carried thereon and the back-up ring 125a above pressure-responsive ring 125.

As previously mentioned, the fluid flowing through the valve exerts a frictional closing force on the valve member. Also, a closing force is exerted by pressure of the fluid being controlled acting upon the underside of the pressure responsive means 127 of the valve member. The coil spring 135 may be used as an additional safety device in case of failure of the fluid control system at times other than the automatic exhaustion of such control fluid in response to a predetermined pressure drop in the well conduit above the valve. That is, the spring may be designed to have sufficient force to actually close the valve should the pressure within the chamber 41 drop below a predetermined amount.

The resilient spring 135 thus acts as a closing force which must be overcome by the force due to control fluid within the chamber 41, such that the effect of changing pressure responsive areas, as the seating surface 40 is actually disengaged from seat 39, is materially reduced. As a result, the possibility of heavy impact of ring 127 upon shoulder 130 during the reopening cycle is lessened. Also, of course, this sudden change in pressure areas is resisted by the increasing effect of spring 135 as it is further compressed during opening. As a matter of fact, the valve has been constructed in actual practice in a manner to permit opening due to control fluid under a pressure one and one-half times that of the controlled fluid acting beneath the closed valve member. It has been found that cracking of the valve member from its seat will not move it to full open position without the application thereto of additional force by means of the control fluid.

In addition, and as previously mentioned, the likelihood of impact upon closing is materially reduced inasmuch as the valve member will start to close as soon as the control fluid has been exhausted to an extent sufficient to permit it to be overcome by the force of the spring. Thus, the suddenness of such movement is avoided. Also, of course, the provision of a suitable flow beam 46 within flow line 42 aids in evening out both the reduction of force by the control fluid, as well as its increase upon opening of the valve.

As previously mentioned, the plug 36, when locked within the flow passage of the valve member, provides an imperforate barrier thereacross. However, the plug is releasable from its locked position and is removable upwardly through the valve member and well conduit to provide a substantially full opening therethrough to permit the passage of well tools and the like. Although the means for so releasably locking the plug within the valve member flow passage does not constitute a part of the present invention, it does provide a convenient method of enabling the substantially full opening, and is described briefly below.

As it is shown in section in FIG. 3A, the plug member 36 comprises a central body 137 and a sleeve portion 138 slidably received thereabout. An O-ring 139 carried by the body provides a sliding seal between the body and sleeve, while packing 38 carried by the sleeve portion seals with a sealing surface 140 on the bore of valve member part 123 when the plug is locked in place. More particularly, the sleeve portion 138 comprises an upper part 141 having a fishing neck 142 at its upper end and a lower part 143 threadedly connected to part 141 and being slotted at its lower end to provide spring fingers 144. A shoulder 145 on upper part 141 of the sleeve portion is landable upon an oppositely facing shoulder on the bore of valve member part 123 for locating the fingers in proper position opposite the lower edge of the valve member.

The central body 137 includes a stem 146 having a fishing neck 147 at its upper end and threadedly connected at its lower end to an expander ring 148 which is closed by a conical nose 149 at its lower end. As shown in FIG. 3A, with the body 137 and sleeve 138 disposed in the relative position shown in FIG. 3A, an outwardly projecting shoulder on the expander ring fits within a correspondingly shaped portion of the fingers 144 to urge them outwardly into locked position beneath the lower edge of the valve member.

Release and removal of the plug from its locked position within the valve member is accomplished by wire line operation. The stem 146 may be jarred downwardly relative to the sleeve portion 138 so as to release expander 148 from its finger-expanding position and the entire plug then lifted from the well conduit. Conversely, the plug is locked in place by being lowered into landed position with the central body and sleeve portions in non-finger-expanding position relative to one another, and the stem then being jarred upwardly with respect to the sleeve portion to move fingers 144 into expanding position.

In view of the foregoing detailed description of the preferred embodiment of the present invention, further detailed study of the alternative apparatus is not thought necessary. As shown in FIG. 9, the casing 53 thereof includes a large diameter tubular portion 150 which is connected by a reducing coupling 151 to the hold-down and seal assembly, which in turn, is connected to a smaller diameter pipe string 152 extending to the producing formation. As can be seen from a comparison of FIG. 9 with FIGS. 3B and 3C, the hold-down and seal assembly of the tubing section 54, including the latching device 56 and packing 57, corresponds in all respects to the similar assembly of the preferred embodiment. An obvious difference between the two embodiments is that in the apparatus of FIG. 9 a removable landing nipple is not provided, but rather the hold-down and seal nipple 55 is connected directly to that portion 59 of the tubing section which forms the valve body.

It will also be understood that the valve 58 is similar in many respects to the valve 32 and, as such, is productive of the novel manner of operation in opening and closing with a minimum of impact. That is, the coil spring 71 may be designed in a manner similar to the spring 135 of the preferred embodiment for acting as a closing force opposite to the force exerted by the control fluid upon pressure responsive means 67.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for controlling flow at a subsurface level within a well conduit comprising landing means disposed in said well conduit at a subsurface level, said landing means having an opening therethrough in substantial alignment with said well conduit to permit the running of well tools therethrough, valve means movable through said well conduit, means for releasably locking said valve means in the opening of said landing means, said valve means being movable between open and closed positions to control flow through said opening, spring means for urging said valve means to closed position, said valve means including pressure-responsive means for urging said valve means to open position against the bias of said spring means, a source of fluid pressure at the surface of said well and conduit means connecting said source of fluid pressure to said pressure-responsive means.

2. Apparatus as set forth in claim 1 wherein said valve means moves to open position against the direction of fluid flow within the well conduit and in an opposite direction to close the same.

3. Apparatus as set forth in claim 1 and further including control means responsive to a predetermined pressure of fluid within the well conduit above said subsurface level for reducing the pressure within said conduit means to allow said valve means to close.

4. Apparatus as set forth in claim 1 and further including means for releasably locking said landing means to said well conduit at said subsurface level.

5. Apparatus for controlling flow at a subsurface level within a well conduit comprising landing means disposed in said well conduit at a subsurface level, said landing means having an opening therethrough in substantial alignment with said well conduit to permit the running of well tools therethrough, valve means movable through said well conduit, means releasably locking said valve means in the opening of said landing means, said valve means having two relatively movable parts defining a variable capacity chamber therebetween, one of said parts having a valve seat thereon and the other of said parts having a valve member thereon seatable with said valve seat, said valve means having a passage therethrough to allow flow through said opening when said valve is unseated from said valve seat, spring means biasing said valve into seated engagement with said valve seat, said valve being movable from said valve seat upon the presence of sufficient pressure within said variable capacity chamber, a source of fluid pressure as the surface of said well, and conduit means connecting said source of fluid pressure to said variable capacity chamber.

6. Apparatus as set forth in claim 5 wherein said valve member moves to open position against the direction of fluid flow within the well conduit and in an opposite direction to close the same.

7. Apparatus as set forth in claim 5 and further including control means responsive to a predetermined pressure of fluid within the well conduit above said subsurface level for reducing the pressure within said conduit means to allow said valve means to close.

8. Apparatus as set forth in claim 5 and further including means for releasably locking said landing means to said well conduit at said subsurface level.

9. Apparatus as set forth in claim 5 wherein said conduit means comprises a port extending laterally from the opening of said landing means to the exterior thereof and a tubing extending from the landing means port exteriorly thereof to said source of fluid pressure, said valve means having a port from the exterior thereof extending into said variable capacity chamber, said landing means ports and said valve means ports being in fluid communication when said valve means is locked in said landing port, and means packing off between said valve means and said landing means about said fluidly communicating ports.

10. Apparatus for controlling flow at a subsurface level within a well conduit comprising landing means disposed in said well conduit at a subsurface level, said landing means having an opening therethrough in substantial alignment with said well conduit to permit the passage of well tools therethrough, valve means movable through said well conduit, means releasably locking said valve means in the opening of said landing means, said valve means having two relatively movable parts defining a variable capacity chamber therebetween, said valve means having a flow passage therethrough and a valve member movable between first and second positions for opening and closing said flow passage, spring means resiliently biasing said valve member to its second position, means for moving said valve member to its first position against the bias of said spring means upon relative movement of said two relatively movable parts resulting from the presence of sufficient pressure within said variable capacity chamber, a source of fluid pressure at the surface of the well, and conduit means connecting said source of fluid pressure to said variable capacity chamber.

11. Apparatus for controlling flow at a subsurface level within a well conduit comprising landing means disposed in said well conduit at a subsurface level, said landing means having an opening therethrough in substantial alignment with said well conduit to permit the running of well tools therethrough, valve means movable through said well conduit, means for releasably securing said valve means in the opening of said landing means, said valve means including valve elements movable between open and closed positions to control flow through said opening, spring means for urging said valve elements to closed position, said valve means including pressure-responsive means for urging said valve elements to open position against the bias of said spring means, a source of fluid pressure at the surface of said well and conduit means connecting said source of fluid pressure to said pressure-responsive means.

12. Apparatus for controlling flow at a subsurface level within a well conduit, comprising: landing means disposed in said well conduit at a subsurface level, said landing means having an opening therethrough in substantial alignment with said well conduit to permit the passage of well tools therethrough, valve means movable through said well conduit, means releasably securing said valve means in the opening of said landing means, said valve means having two relatively movable parts defining a variable capacity chamber therebetween, said valve means having means providing a linear flow passage therethrough and valve members movable between first and second positions for opening and closing said flow passage, spring means resiliently biasing said valve members to the second position, means for moving said valve members to the first position against the bias of said spring means upon relative movement of said two relatively movable parts resulting from the presence of sufficient pressure within said variable capacity chamber, a source of fluid pressure at the surface of the well, and conduit means connecting said source of fluid pressure to said variable capacity chamber.

13. Apparatus for use in controlling flow at a subsurface level within a well conduit comprising a landing nipple adapted to be disposed in a well conduit, said landing nipple having an axial opening therethrough, valve means movable into and out of said landing nipple opening, means releasably securing said valve means in said opening, said valve means including valve elements movable between open and closed positions to control flow through said opening, said valve means including pressure-responsive means for urging said valve elements to open position, and conduit means from the exterior of said landing nipple to said pressure-responsive means.

14. Apparatus for use in controlling flow at a subsurface level within a well conduit comprising a landing nipple disposed in said well conduit at a subsurface level, said landing nipple having an opening therethrough in substantial alignment with said well conduit to permit the running of well tools therethrough, said landing nipple including means for releasably securing a valve in said opening, said landing nipple having a port extending from said opening to the exterior thereof, a source of fluid pressure at the surface of said well, and a tubing extending from said landing nipple port to said source of fluid pressure.

15. Apparatus as set forth in claim 14 and further including means for releasably locking said landing nipple to said well conduit at said subsurface level.

16. Apparatus for controlling flow from a well at a subsurface level comprising a well casing extending to the surface of said well, a tubing disposed in said casing and having its upper termination below the surface of said well, a landing means connected to said tubing, said landing means having an opening therethrough in substantial alignment with said tubing to permit the running of tools therethrough, valve means movable through said casing, means for releasably securing said valve means in the opening of said landing means, said valve means including valve elements movable between open and closed positions to control flow through said opening, spring means for urging said valve elements to closed position, said valve means including pressure-responsive means for urging said valve elements to open position against the bias of said spring means, a source of fluid under pressure at the surface of said well and conduit means connecting said source of fluid pressure to said pressure-responsive means.

17. Apparatus as set forth in claim 16 and further including means for releasably locking said landing nipple to said tubing.

References Cited in the file of this patent

UNITED STATES PATENTS

| | | |
|---|---|---|
| 2,033,563 | Wells | Mar. 10, 1936 |
| 2,227,545 | Haslam | Jan. 7, 1941 |
| 2,231,282 | Norris | Feb. 11, 1941 |
| 2,307,983 | Barnes | Jan. 12, 1943 |
| 2,351,322 | Crake | June 13, 1944 |
| 2,370,476 | Lynd | Feb. 27, 1945 |
| 2,375,432 | Miller et al. | May 8, 1945 |
| 2,397,199 | Orr | Mar. 26, 1946 |
| 2,404,825 | Brown et al. | July 30, 1946 |
| 2,503,115 | Livingston | Apr. 4, 1950 |
| 2,518,795 | Knox | Aug. 4, 1950 |
| 2,760,578 | Tausch | Aug. 28, 1956 |
| 2,772,738 | Tausch | Dec. 4, 1956 |
| 2,780,290 | Natho | Feb. 5, 1957 |
| 2,963,089 | Sizer | Dec. 6, 1960 |